(12) United States Patent
Gordon (10) Patent No.: US 6,203,100 B1
(45) Date of Patent: Mar. 20, 2001

(54) SPORT-UTILITY VEHICLE TOP

(75) Inventor: W. Dale Gordon, Oneida, TN (US)

(73) Assignee: Fleet Air Industries, Inc., Oneida, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,811

(22) Filed: Nov. 12, 1999

Related U.S. Application Data (63) Continuation-in-part of application No. 08/903,984, filed on Jul. 31, 1997, now Pat. No. 6,003,936.

(51) Int. Cl.⁷ .................................................... B60J 7/00
(52) U.S. Cl. ......................... 296/218; 296/224; 296/210; 296/102; 296/213
(58) Field of Search .................................. 296/103, 218, 296/224, 210, 102, 213, 10

(56) References Cited

U.S. PATENT DOCUMENTS

| | | |
|---|---|---|
| 3,974,753 | 8/1976 | Blomgren et al. . |
| 4,120,524 | 10/1978 | Buck, Jr. . |
| 4,186,525 | 2/1980 | Carvalho . |
| 4,205,875 | 6/1980 | Smoth . |
| 4,257,632 | 3/1981 | DeStepheno . |
| 4,266,824 | 5/1981 | Inamoto . |
| 4,469,370 | 9/1984 | Peterson . |
| 4,475,765 | 10/1984 | Vogt et al. . |
| 4,662,672 | 5/1987 | Yamamoto et al. . |
| 4,723,812 | 2/1988 | Masuda et al. . |
| 4,784,431 | 11/1988 | Ohhashi et al. . |
| 4,957,326 | 9/1990 | Chiba et al. . |
| 5,035,463 | 7/1991 | Kato et al. . |
| 5,052,743 | 10/1991 | Inada et al. . |
| 5,314,225 | 5/1994 | Gordon . |
| 5,540,478 | 7/1996 | Schiich . |
| 5,725,273 | 3/1998 | Vernon et al. . |
| 6,003,936 | * 12/1999 | Gordon ................................ 296/218 |

FOREIGN PATENT DOCUMENTS 3024619    1/1982   (DE) .

\* cited by examiner

Primary Examiner—Joseph D. Pape
Assistant Examiner—Kiran B. Patel
(74) Attorney, Agent, or Firm—Pitts and Brittian, P.C.

(57) ABSTRACT

A replacement two-piece rigid top for a sport utility vehicle. Two-piece top is provided with a rigid shell member that covers and at least partially encloses the passenger area and rear cargo area of the sport utility vehicle, a removable rigid roof panel that covers the forward passenger/driver area, and door panel members that are removably engaged with and secured to the factory-installed half-doors on certain sport utility vehicles. Rigid shell member is provided with a forward edge that is specially configured so as to form a forward recessed region that channels moisture away from the cabin of the sport utility vehicle. The roof panel is removably secured to rigid shell member, and, preferably, forms a weather-tight junction proximate rearward edge with rigid shell member. This allows the shell member to remain on the vehicle while allowing the roof panel to be selectively removed.

14 Claims, 8 Drawing Sheets

SPORT-UTILITY VEHICLE TOP

CROSS-REFERENCE TO RELATED APPLICATIONS

This continuation-in-part application discloses and claims subject matter disclosed in my earlier filed pending application, Ser. No. 08/903,984, which was filed on Jul. 31, 1997, now U.S. Pat. No. 6,003,936.

STATEMENT REGARDING FEDERALLY SPONSORED RESEARCH OR DEVELOPMENT

Not Applicable

BACKGROUND OF THE INVENTION

1. Field of Invention

This invention relates to the field of sport-utility vehicle tops. More particularly, it relates to a rigid full two-piece sport-utility vehicle top having a removable hard top section.

2. Description of the Related Art

It is common for sport-utility vehicles, ("SUVs"), to have removable tops. Conventionally, these tops are either rigid, i.e. "hardtop", or constructed of a canvas or similar material, i.e. "soft top". Conventionally hardtop vehicles have a one-piece top, in which removal of the top necessarily requires removal of the entire top. This results in an all or nothing situation for the driver that wishes some exposure to the elements of wind and sunlight. However, it is often preferable to be able to only remove a portion of the top as can be done with conventional sun-roofs or "T-top" configurations. In order to compensate for this, certain SUV manufacturers have designed SUV's with hybrid tops in which the roof panel over the driver is readily removable without the need to remove the separate rear roof portion from the vehicle.

In my previous patent, U.S. Pat. No. 5,314,225, issued on May 24, 1994, I disclosed a sport truck top that allowed replacement of a factory installed soft top, in such a hybrid top vehicle, with a rigid shell top with out the necessity of replacing the factory installed weather seals. That invention did not provide for a two-piece top in which the roof panel could be removed while maintaining the main top shell on the vehicle.

Other known devices are those disclosed in the following U.S. Pat. Nos.:

| U.S. Pat. No. | Inventor Name | Issue Date |
| --- | --- | --- |
| 5,752,273 | Vernon et al. | 3/1998 |
| 4,957,326 | Chiba et al. | 9/1990 |

However, what is missing from the art is an improved rigid SUV two-piece top that can replace either a factory installed hardtop or a factory installed soft top and that has a rigid removable roof panel.

Accordingly, it is an object of the present invention to provide a rigid two-piece top in which the roof panel alone or the entire top may be removed for a sport utility vehicle.

It is a further object of the present invention to provide such a top that can replace either a factory installed hard top or a factory installed soft top.

It is still another object to provide such a top that is structurally reinforced and that offers a high degree of prevention of leaking by providing a weather-tight junction between the two main components of the top.

Other objects and advantages over the prior art will become apparent to those skilled in the art upon reading the detailed description together with the drawings as described as follows.

BRIEF SUMMARY OF THE INVENTION

In accordance with the teachings of the present invention a rigid two-piece sport utility vehicle replacement top, in which the roof panel, alone, or the entire top may be removed is provided. The two-piece top is provided with a rigid shell member that covers the passenger area and rear cargo area of the sport utility vehicle. Further, the two-piece top is provided with a removable rigid roof panel that covers the forward passenger/driver area. The rigid roof panel is removably secured to the shell member, and, preferably, forms a weather-tight junction with the rigid shell member. Further, the rigid shell member is provided with a forward recessed region that serves as a rain gutter that channels water away from the interior of the vehicle. In the preferred embodiment, the rigid shell member is further provided with a rear lift-gate and side windows. Further, in the preferred embodiment, the two-piece top is further provided with upper door members that engage the factory-installed half-doors on certain sport utility vehicles.

The rigid shell member and the rigid roof panel are, preferably constructed of fiberglass that is reinforced with an inlaid core mat that provides structural rigidity and strength while maintaining the light-weight nature of the two-piece top.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
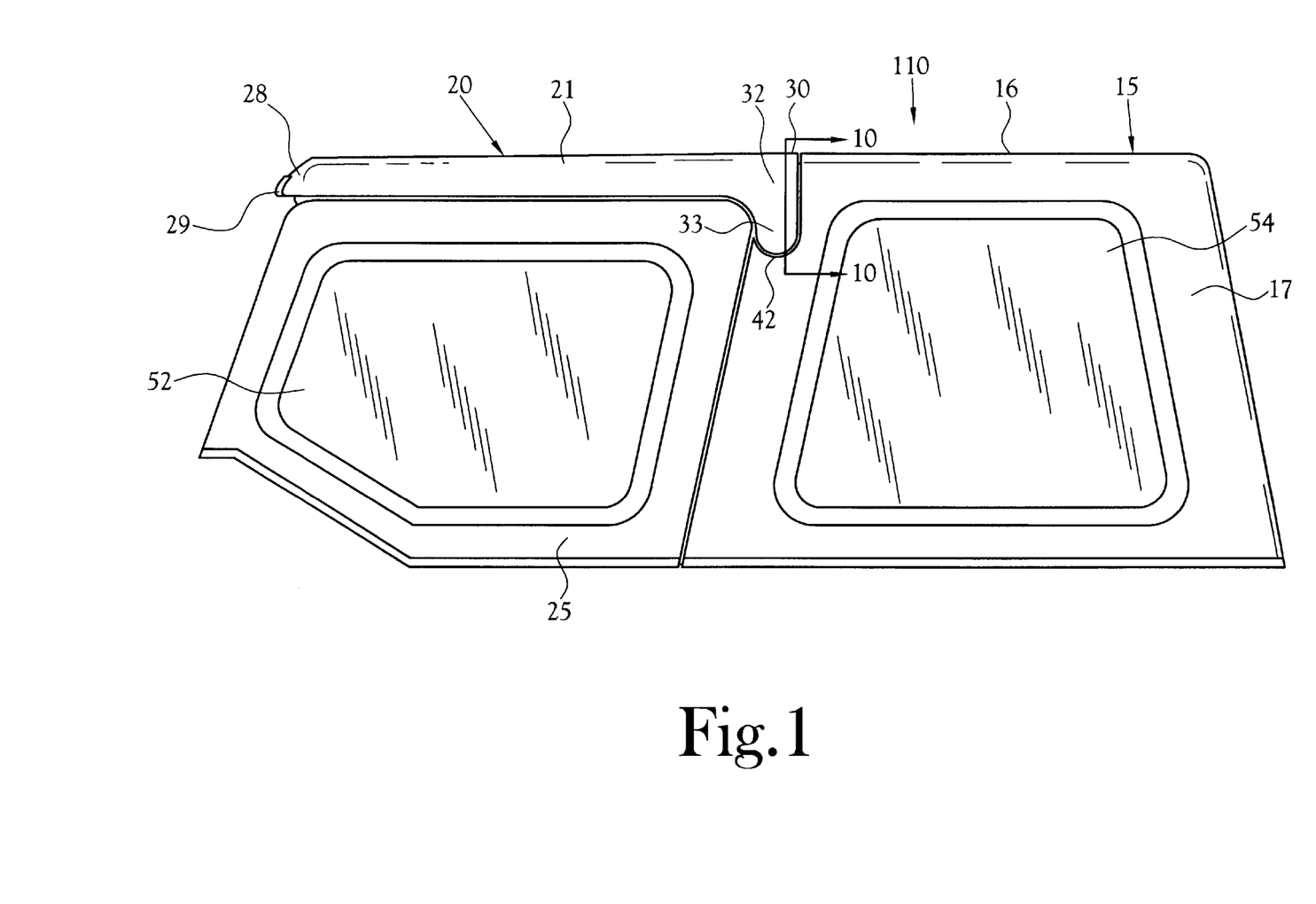
FIG. 1 illustrates a side elevation view of the two-piece sport utility vehicle top of the present invention.
Figure 1A:
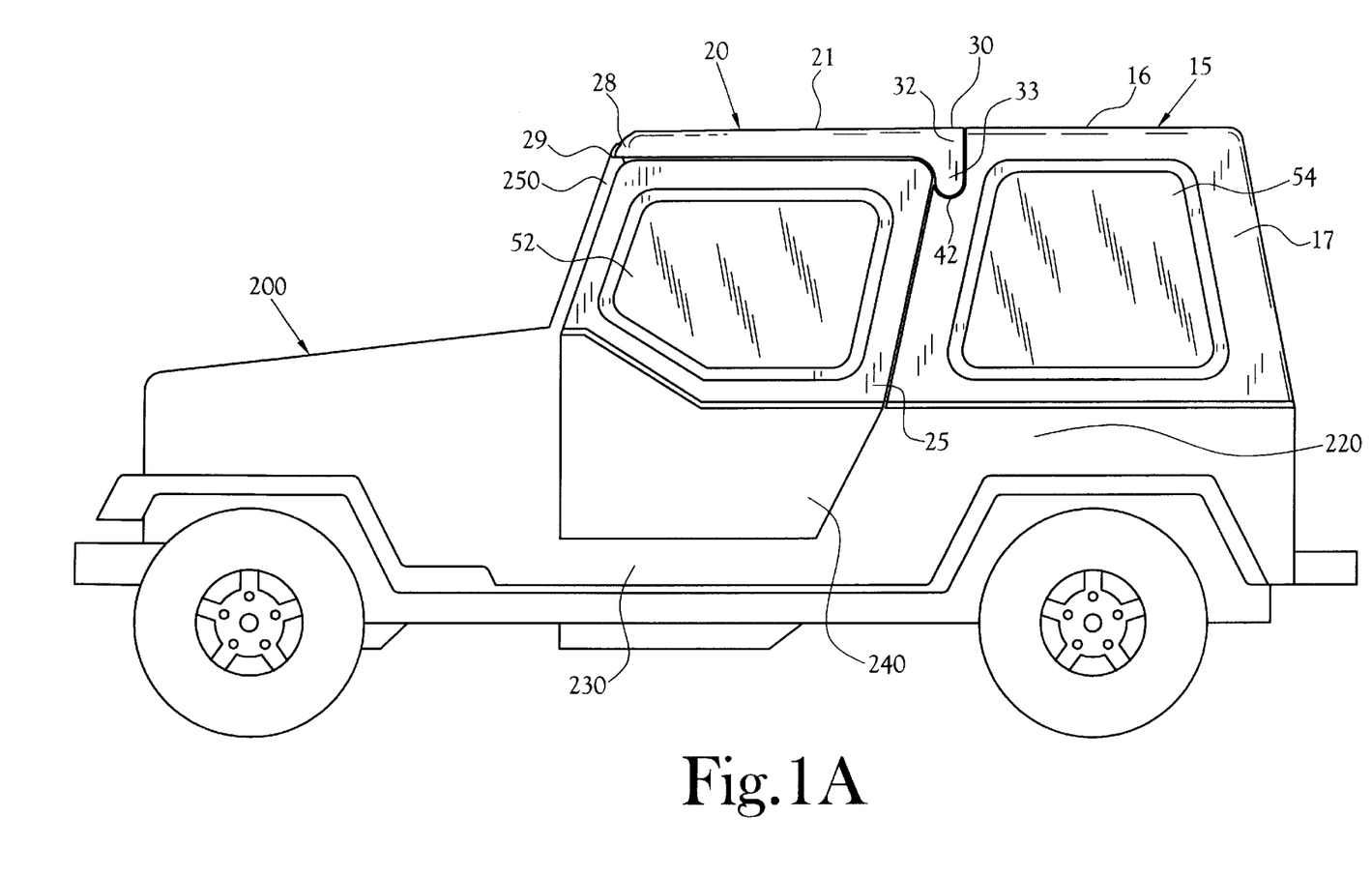
FIG. 1A illustrates a side elevation view of the two-piece sport utility vehicle top of the present invention shown on a conventional sport utility vehicle.

A replacement two-piece rigid top for a sport utility vehicle, constructed in accordance with the present invention, is illustrated generally as 110 in the figures. While FIG. 1 is a left side elevation view and the right side elevation view is not depicted, it will be appreciated by those skilled in the art that the right side of two-piece top 110 is substantially a mirror image of the left side. In the preferred embodiment, two-piece top 110 is provided with a rigid shell member 15 that covers and at least partially encloses the aft section 220 of sport utility vehicle 200, a removable rigid roof panel 20 that covers the forward section 230, and door panel members 25 that are removably engaged with and secured to factory-installed half-doors 240 on certain sport utility vehicles, such as the JEEP® Wrangler. In the preferred embodiment, doors 25 are provided with windows 52.

Rigid shell member 15 has a substantially horizontal planar top surface area 16, side panels 17 and a rear panel 18. In the preferred embodiment, side panels 17 are provided with windows 54 and rear panel 18 is provided with a lift gate 50. Further, rigid shell member 15 is provided with a forward edge 35.

Figure 3:
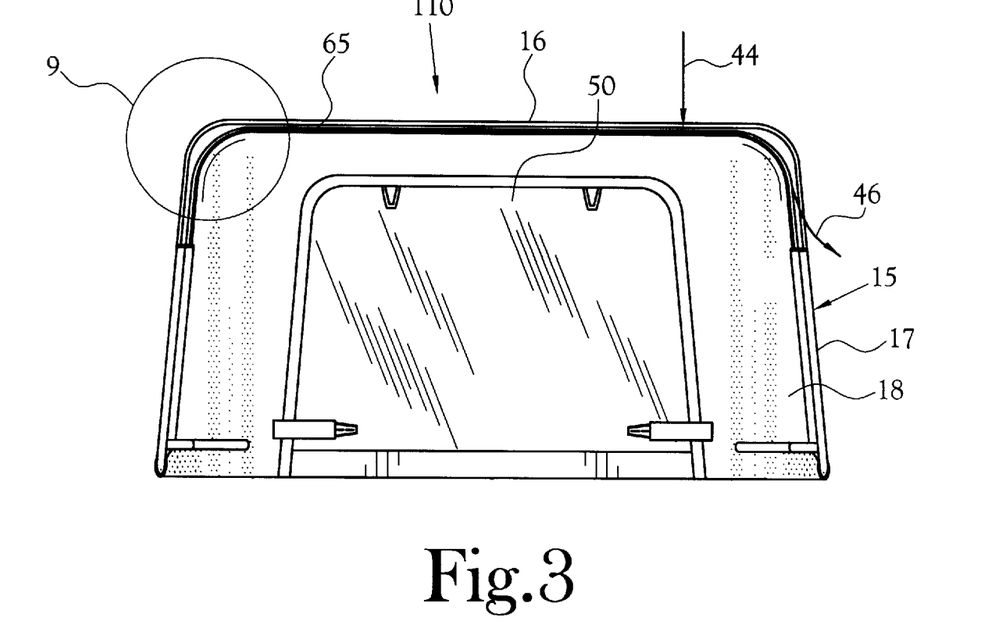
FIG. 3 illustrates a front elevation view of the top, as illustrated in FIG. 2, with the roof panel and door members removed.
Figure 4:
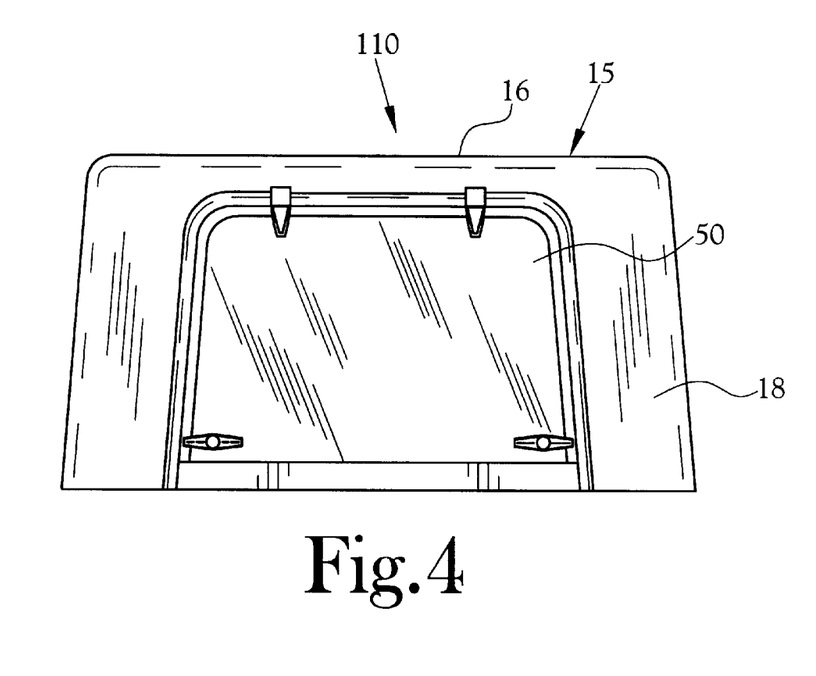
FIG. 4 illustrates a rear elevation view of the top shown in FIG. 1.
Figure 5:
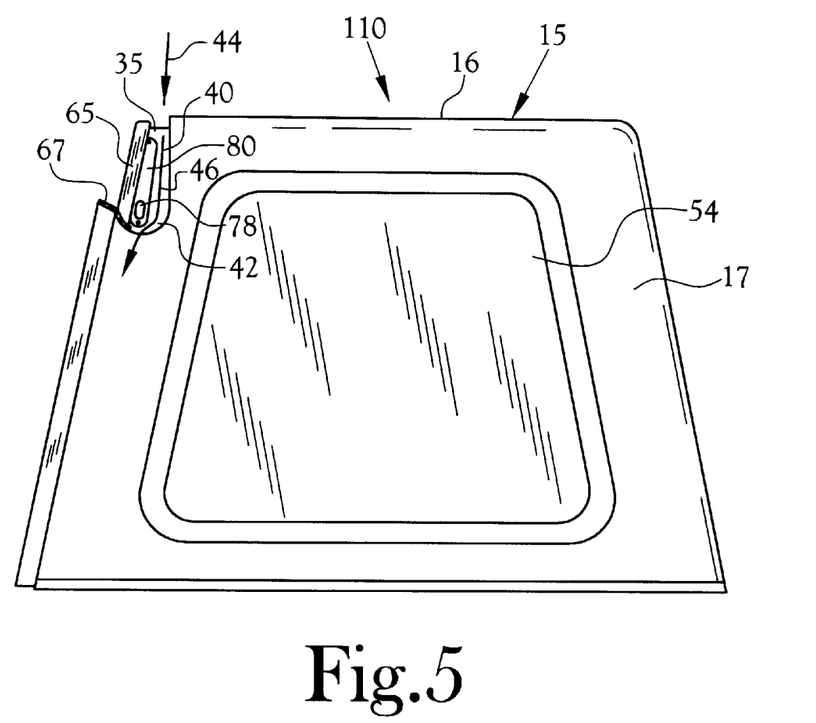
FIG. 5 illustrates a side elevation view of the top as shown in FIG. 2 with the rigid roof panel and door members removed.
Figure 6:
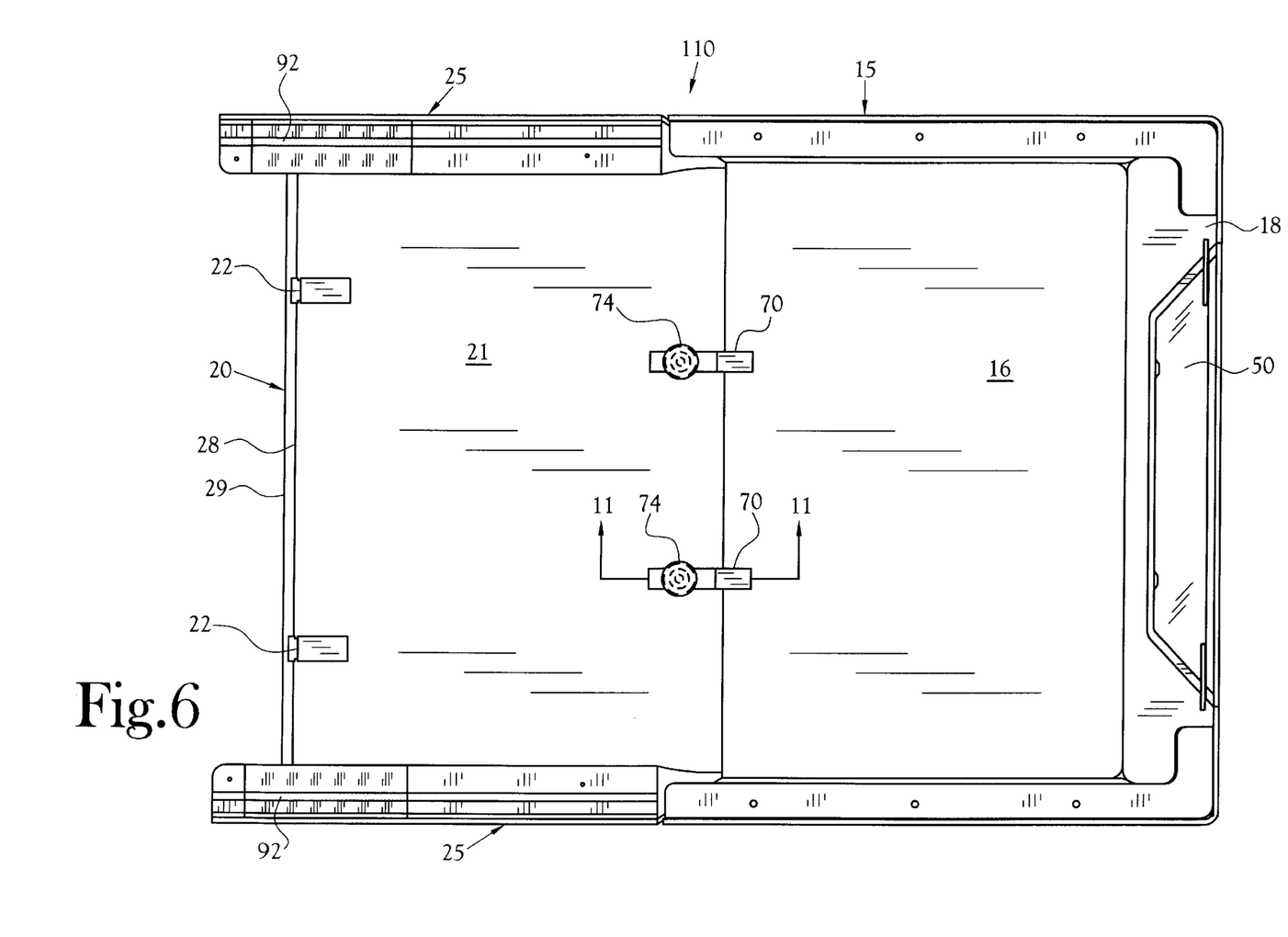
FIG. 6 illustrates a bottom plan view of the top shown in FIG. 1.

As seen in FIG. 5, forward edge 35 is specially configured so as to form a forward recessed region 40 that, as will be discussed more fully herein below, serves as a channel or rain gutter to direct water, as from rain or sleet or other sources of moisture, away from the interior of the vehicle. In the preferred embodiment, recessed region 40 terminates in lower recesses 42. In the preferred embodiment, lower recesses 42 are substantially arcuate. In this regard, as seen in FIGS. 3 and 5, moisture, such as rain would enter recessed region 40 in the direction indicated by arrows 44, be prevented from entering in the passenger cabin by gasket 65 and exit recessed region 40 proximate lower recesses 42 in the direction indicated by arrows 46.

Figures 11, 12A:
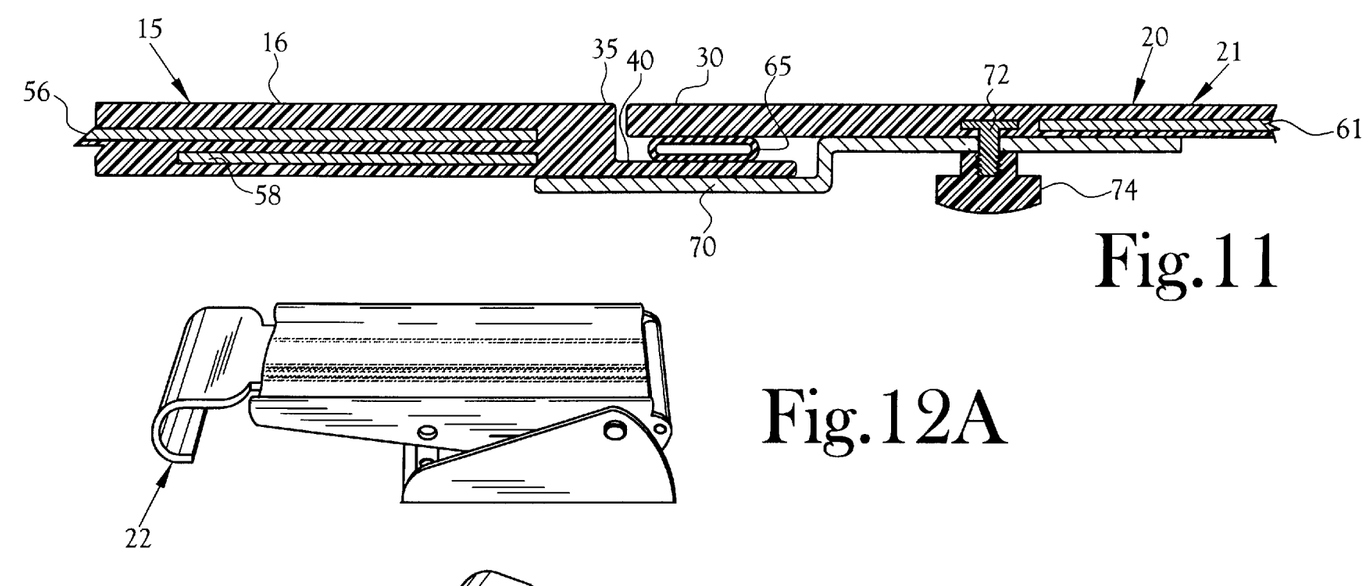
FIG. 11 illustrates a partial cross-section view, taken along line 11—11 in FIG. 6.
FIG. 12A illustrates a perspective view of the preferred securing latch, shown in the closed position, for securing the roof panel to the shell member.
Figure 12B:
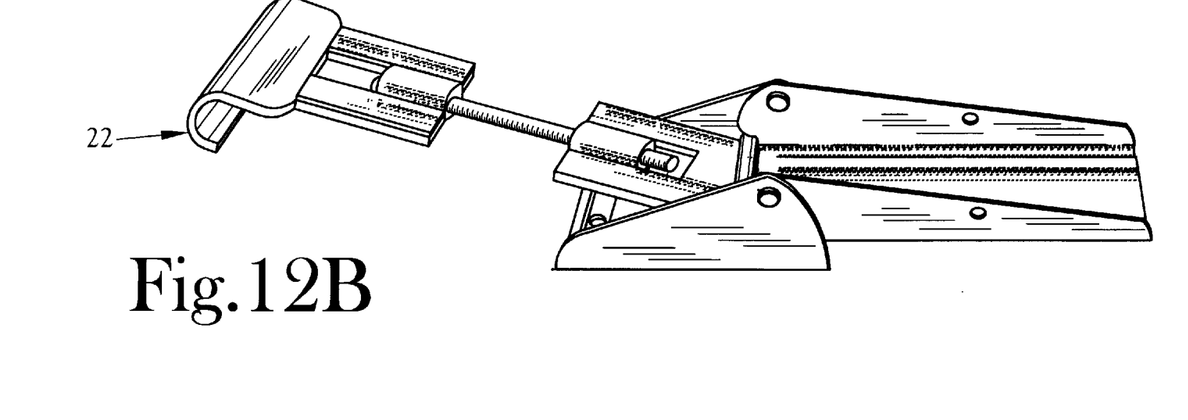
FIG. 12B illustrates a perspective view of the preferred securing latch, shown in the open position, for securing the roof panel to the shell member.

Rigid roof panel 20 has a forward edge 28 that adjoins the top of SUV's 200 windshield frame 250 and is releasably secured to windshield frame 250 by state of the art latches 22 shown in FIGS. 12A (closed and retracted) and 12B (open and extended). In the preferred embodiment, a gasket member 29 provides a weather-tight junction between the top of windshield frame 250 and forward edge 28. Roof panel 20 also comprises a substantially horizontal planar area 21, a rearward edge 30 and downwardly angled flange members 32 that terminate in end portions 33, proximate rearward edge 32. In the preferred embodiment, end portions 33 are substantially arcuate. Roof panel 20 is removably secured to rigid shell member 15, and, preferably, forms a weather-tight junction proximate rearward edge 30 with rigid shell member 15.

As mentioned above, forward edge 35 of shell member 15 is provided with a forward recessed region 40 that serves as a channel or rain gutter to direct water or other moisture away from the interior of the vehicle. In this regard, forward recessed region 40 has a perimetrically disposed gasket 65. Gasket 65 is, in the preferred embodiment, state of the art door gasket as is typically used to seal vehicle doors. Recessed region 40 extends across the top of shell member 15 and partially down side panels 17 terminating, as described above, at lower recesses 42. As can be seen in FIG. 11 (not shown to scale), when roof panel 20 is in place, rearward edge 32 of roof panel 20 overlaps forward edge 35 of shell member 15 and engages and compresses gasket 65. Further, flange members 32 also engage the side portions of recessed region 40 with end portions 33 nesting within and engaging the lower recesses 42. In order to provide cushioning, gasket material 67 is disposed proximate the lower recesses 42.

In the preferred embodiment, as seen in FIG. 11, rearward edge 32 of roof panel 20 is removably secured to forward edge 35 of shell member 15 by means of a hasp 70. In this regard, at least one, and preferably two displaced one from the other, threaded fasteners 72 are embedded in roof panel 20. Hasp 70 is provided with a hole member for receiving threaded fastener 72 and engages rearward edge 32 of roof panel 20 and forward edge 35 of shell member 15 as seen in FIG. 11. A graspable nut 74 is threadably engaged with threaded fastener 72 and frictionally secures hasp 70 in tight engagement with rearward edge 32 of roof panel 20 and forward edge 35 of shell member 15.

Figure 10:
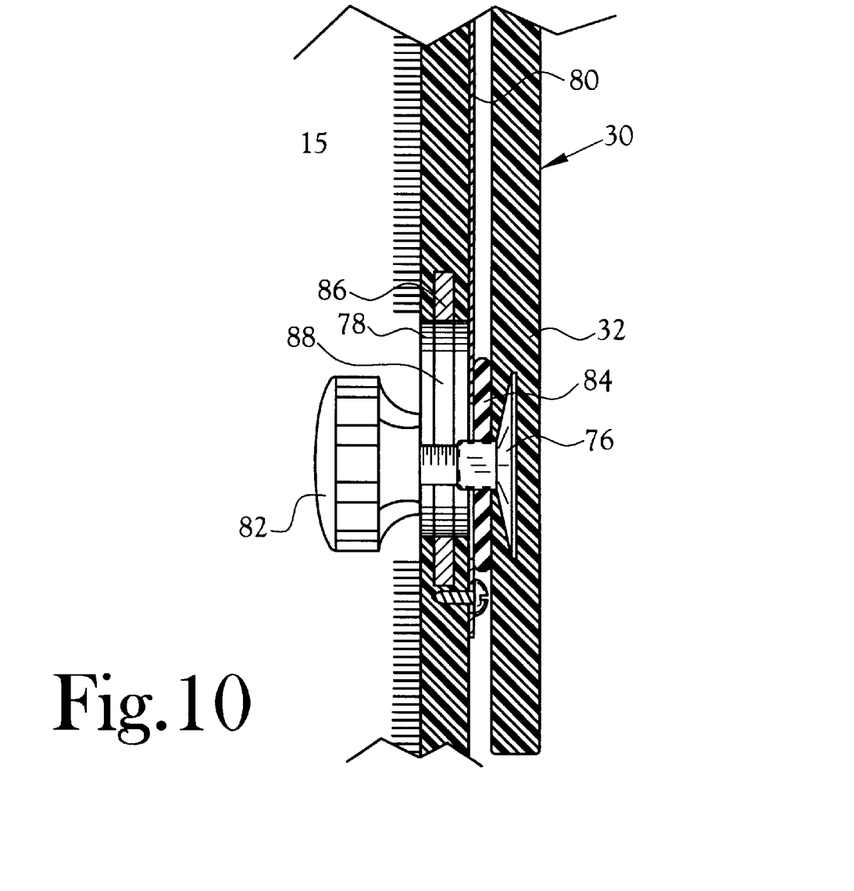
FIG. 10 illustrates a view in partial cross-section, taken along line 10—10 in FIG. 1.

As seen in FIG. 10, to further assist in releasably securing roof panel 20 to shell member 15, an additional threaded fastener 76 is embedded within flange member 32. A registering hole member 78 is provided within the side portions of recessed regions 40. A graspable nut 82 threadably engages fastener 76 and frictionally secures flange member 32 to side panel 17 of shell member 15. In order to prevent direct, and potentially abrasive, fiberglass to fiberglass contact at this point of contact, a resilient pad 84 is disposed between flange member 32 and side portion of recessed region 40. Further, in the preferred embodiment, in order to prevent threaded fastener 76 from abrading this area of recessed region 40 as roof panel 20 is placed on shell member 15, a skid plate 80, having a hole member that registers with hole member 78, is secured to the side portion of recessed region 40. Those skilled in the art will recognize that vibration caused by travel on or off road will cause threaded member 76 to abrade and enlarge hole member 78. In order to overcome this undesirable condition, an elongated washer 86, having a hole member 88 that registers with hole member 78 is embedded in the fiberglass in side area of recessed region 40.

Figure 2:
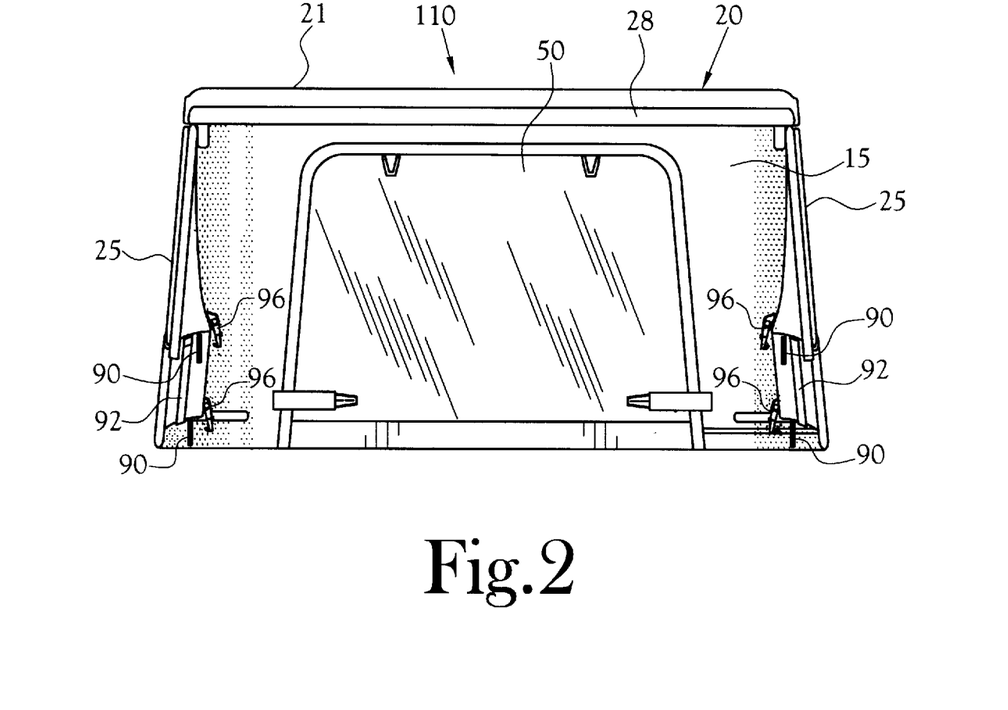
FIG. 2 illustrates a front elevation view of the top shown in FIG. 1.
Figure 7:
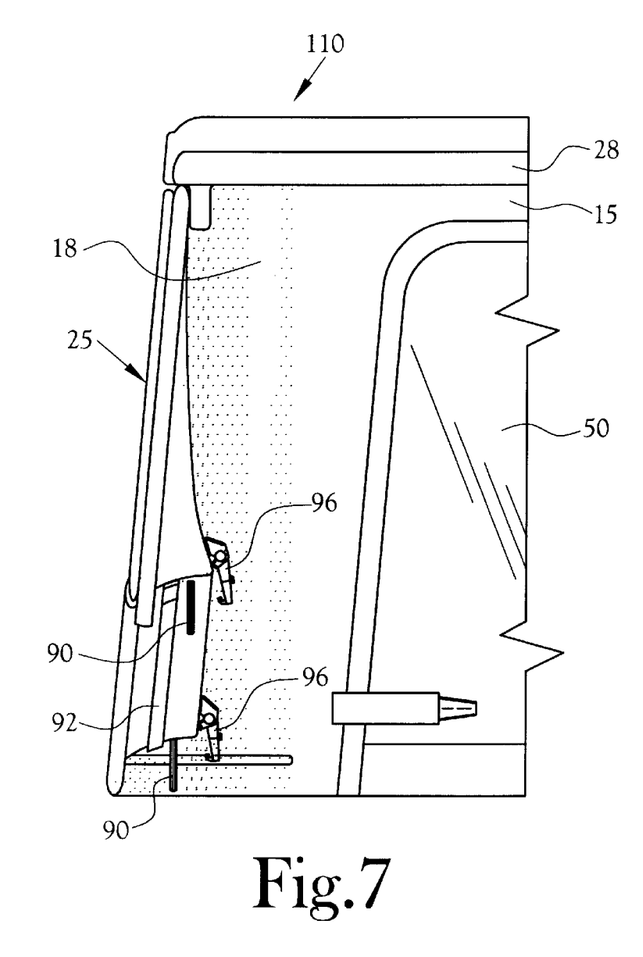
FIG. 7 illustrates a partial front elevation view of the top showing detail of front view of the preferred door member.
Figure 8:
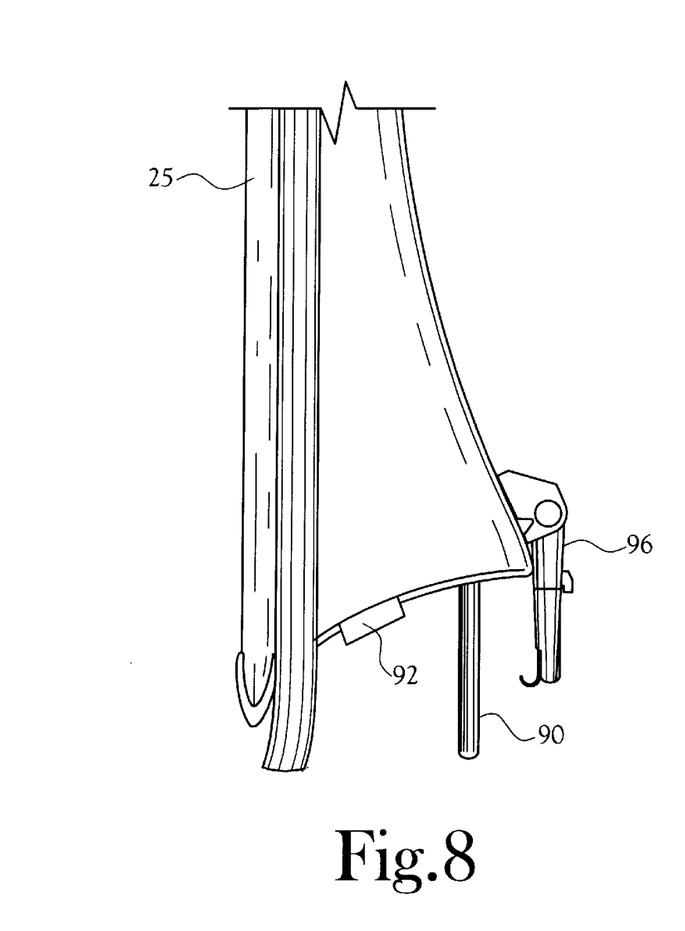
FIG. 8 illustrates a rear elevation view of the preferred door member of the present invention.

As discussed above, and referring to FIGS. 2, 7 and 8, door panels 25 are removably secured to factory installed half-doors 240 common on certain SUVs, such as the JEEP® Wrangler. Those skilled in the art will recognize that the factory installed removable door panels (not shown) have pins on the bottom of the door panel that register with and are received by hole members in factory installed door 240. Likewise, door panels 25 are equipped with pins 90 that register with and are received by the pre-existing factory hole members in the factory door. Conventional latches 96 are further utilized to secure door panel 25 to the factory installed lower half door 240. A gasket 92 insulates the fiberglass door panel 25 from the factory installed lower half door 240 and creates a weather-tight junction there between.

Figure 9:
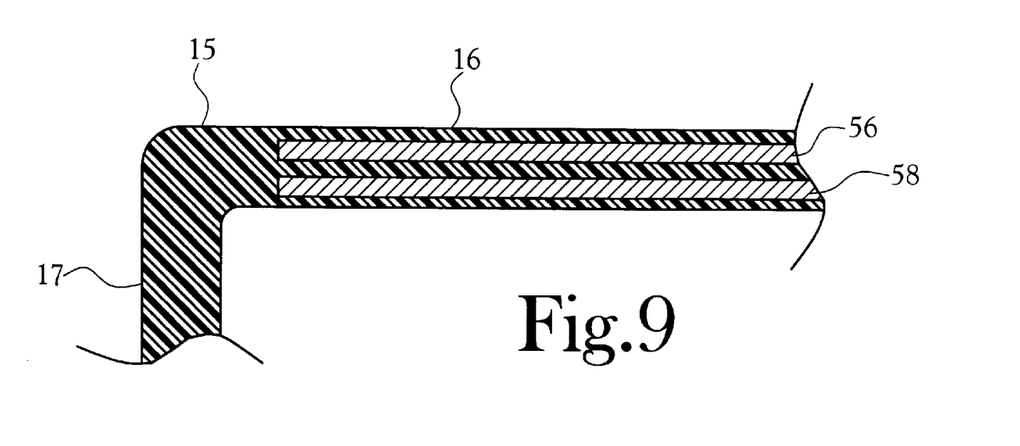
FIG. 9 illustrates a partial cross-section view of the area within circle 9 in FIG. 3.

Referring to FIGS. 9 and 11, (not drawn to scale), rigid shell member 15 and rigid roof panel 20 are preferably constructed of fiberglass. As can be seen in the figures, rigid shell member 15 has a large horizontally disposed surface area 16. Likewise, roof panel 20 also has a large horizontally disposed surface area 21. In order to provide structural rigidity, and thereby prevent these horizontal surfaces 16 and 21 from sagging under their own weight, (and the weight of moisture or accumulated snow), horizontal surfaces 16 and 21 are reinforced with inlaid core mats 56 and 61, respectively. In order to further reinforce leading edge 35 of shell member 15, an additional narrow layer of inlaid core mat 58 is embedded within the fiberglass shell. While in the preferred embodiment core mat Baltek mat TMK 3000 by GLS Corporation is utilized, it will be appreciated by those skilled in the art that any type of reinforcing woven fiber mat can be used to fulfil the intended function of providing structural rigidity and strength while maintaining the light-weight nature of two-piece top 110.

From the foregoing description, it will be recognized by those skilled in the art that a two-piece replacement top, for a convertible sport utility vehicle, offering advantages over the prior art has been provided. Specifically, the two piece replacement top provides a hard-top for a sport utility vehicle to serve as a replacement for the sport utility vehicle's factory installed one-piece hard or soft convertible top. This is achieved by providing a rigid two-piece top in which the roof panel alone or the entire top may be removed and can replace either a factory installed hard top or a factory installed soft top. The top is structurally reinforced and offers a high degree of prevention of leaking by providing a weather-tight junction between the two main components of the top.

While a preferred embodiment has been shown and described, it will be understood that it is not intended to limit the disclosure, but rather it is intended to cover all modifications and alternate methods falling within the spirit and the scope of the invention as defined in the appended claims.

What is claimed is:

1. A two-piece removable top for a sport utility vehicle wherein the sport utility vehicle has a body, a windshield frame having a top edge, factory-installed half doors, a forward section, and an aft section, said two-piece top comprising:

a removable rigid shell member for at least partially enclosing the aft area, wherein said removable rigid shell member includes at least a substantially horizontal planar top surface area, side panels integrally connected to and downwardly disposed from said horizontal planar top surface area, a rear panel integrally connected to said top surface area and said side panels and a forward edge disposed proximate said top surface area, wherein said forward edge is selectively configured so as to form a forward recessed region for channeling moisture away from the interior of the vehicle, wherein said forward recessed region of said removable rigid shell member includes a perimetrically disposed gasket member, and further wherein said forward recessed region extends across said horizontal planar area of said shell member and partially down said side panels terminating at lower recesses;

a removable rigid roof panel removably secured to said removable rigid shell member for covering the forward passenger area of the sport utility vehicle, wherein said roof panel has a substantially horizontal planar top surface area, a forward edge disposed proximate said top surface area of said roof panel that adjoins the top of the sport utility vehicle's windshield frame, a rearward edge and downwardly angled flange members proximate said rearward edge, wherein said downwardly angled flange members proximate said rearward edge of said roof panel terminate in end portions, further wherein said rearward edge of said removable rigid roof panel overlaps said forward edge of said removable rigid shell member, and said end portions of said flange members nest within said lower recesses of said forward recessed region of said rigid shell member; and means for removably securing said removable rigid roof panel to said removable rigid shell member when said removable rigid roof panel is covering the forward passenger area whereby a weather-tight junction is formed between said removable rigid shell member and said removable rigid roof panel.

2. The two-piece top of claim 1 wherein said side panels include at least one window member.

3. The two-piece top of claim 1 wherein said downwardly angled flange members proximate said rearward edge of said roof panel terminate in arcuate end portions.

4. The two-piece top of claim 3 wherein said forward recessed region extends across said horizontal planar area of said shell member and partially down said side panels terminating at arcuate lower recesses.

5. The two-piece top of claim 4 wherein said arcuate end portions of said flange members register with said arcuate lower recesses of said forward recessed region of said rigid shell member.

6. The two-piece top of claim 1 wherein said rear panel of said shell member is provided with a lift gate.

7. The two-piece top of claim 1 wherein said rigid roof panel is releasably secured to the sport utility vehicle's windshield.

8. The two-piece top of claim 1 wherein a gasket member provides a weather-tight junction between the top edge of the windshield frame and said forward edge of said rigid roof panel.

9. The two-piece top of claim 1 wherein said two-piece top is constructed of fiberglass.

10. The two-piece removable top of claim 1 wherein a threaded fastener is embedded within each said flange member, and each said side portion of said recessed region includes a hole member in register with said threaded fastener, wherein said threaded fastener and a further included nut member provide additional means for releasably securing said rigid roof panel to said removable rigid shell member, thereby releasably securing said flange member to said side panel of said removable rigid shell member.

11. The two-piece removable top of claim 10 wherein said removable rigid shell member further includes a skid plate member fastened proximate said side portion of said recessed region order thereby preventing said threaded fastener from abrading said side portion of said recessed region, said skid plate including a hole member in register with said hole member disposed in said side portion of said recessed region.

12. The two-piece removable top of claim 10 wherein said removable rigid shell member further includes an embedded elongated steel washer having a hole member in register with said hole member disposed in said side portion of said recessed region, whereby said threaded fastener is prevented from abrading and enlarging said hole member in said side portion of said recessed region of said rigid shell member.

13. The two-piece removable top of claim 10 wherein said two-piece removable top includes means embedded within said fiberglass for providing structural rigidity to said fiberglass.

14. The two-piece top of claim 13 wherein said embedded means for providing structural rigidity comprises a mat of woven fibrous material.

* * * * *